United States Patent [19]

Steinbiss et al.

[11] Patent Number: 4,496,396
[45] Date of Patent: Jan. 29, 1985

[54] METHOD AND APPARATUS FOR BURNING FINE GRAINED MATERIAL, PARTICULARLY RAW CEMENT MEAL

[75] Inventors: Eberhard Steinbiss, Düsseldorf; Horst Herchenbach, Hennef; Hubert Ramesohl, Bergisch Gladbach; Albrecht Wolter, Cologne, all of Fed. Rep. of Germany

[73] Assignee: Klöckner-Humboldt-Deutz AG, Fed. Rep. of Germany

[21] Appl. No.: 531,275

[22] Filed: Sep. 12, 1983

[30] Foreign Application Priority Data

Oct. 4, 1982 [DE] Fed. Rep. of Germany ....... 3236652

[51] Int. Cl.$^3$ ............................................... C04B 7/50
[52] U.S. Cl. ..................................... 106/100; 432/13; 432/106
[58] Field of Search ................... 106/100; 432/13, 106

[56] References Cited

U.S. PATENT DOCUMENTS

| | | | |
|---|---|---|---|
| 4,342,598 | 8/1982 | Kogan | 106/100 |
| 4,392,890 | 7/1983 | Henin et al. | 106/100 |
| 4,435,159 | 3/1984 | Knudsen | 106/100 |
| 4,461,645 | 7/1984 | Roth et al. | 106/100 |

*Primary Examiner*—James Poer
*Attorney, Agent, or Firm*—Hill, Van Santen, Steadman & Simpson

[57] ABSTRACT

A method and apparatus for burning fine grained products, such as raw cement meal, wherein the product is preheated in a preheating stage, calcined in a calcining stage, and is burned into clinker in a clinker stage followed by cooling in a cooling stage. The heating of the largely calcined product in the temperature range of about 900° C. to the beginning of alite formation which occurs at approximately 1250° C. is carried out under the fastest possible temperature rise conditions and the clinker reaction is carried out in concurrent flow with the gas stream in the burning stage. The clinker is then graded into a coarse grained fraction and a fine grained fraction which are then cooled in separate coolers after separation from the gas stream.

20 Claims, 5 Drawing Figures

METHOD AND APPARATUS FOR BURNING FINE GRAINED MATERIAL, PARTICULARLY RAW CEMENT MEAL

BACKGROUND OF THE INVENTION

1. Field of the Invention

This invention is in the field of heat treatment of finely divided particles, such as raw cement meal and seeks to improve the heat economy of such a system by providing a rapid heating for the meal in the clinker stage, and separately collecting coarse and fine grained fractions from the treatment.

2. Description of the Prior Art

The dry burning method is predominantly employed in industry for the manufacture of cement, particularly portland cement. Originally, the entire process of preheating, deacidification and sintering was performed in a rotary tubular kiln. Subsequently, a separate heat exchanger outside the rotary tubular kiln was provided to accomplish the preheating and finally, the deacidification reaction with its relatively great heat consumption was transferred into a separate calciner. Use of separate stages has the advantage that both the preheating and the calcination were significantly more efficient because of better heat transfer with the fine grained material in suspension in hot gases rather than in a product bed. Consequently, the specific heat consumption in the burning of cement particles could be considerably reduced.

Approximately 30 to 40% of the overall fuel charge is used in the sintering burning of the material in the rotary tubular kiln when the pretreatment steps are separated as stated, and where there is complete deacidification in the calciner. The term "sintering burning" in this context refers to heating the product from approximately 900° C. following calcination up to a temperature in the range of incipient alite formation at approximately 1250° C. as well as to the range of the sintering reaction of lime and silicon components above 1300° C. into technical tricalciumsilicate characterized by the formation of melt phases. The clinker reaction or the "maturing" is considered concluded when all but slight residues of CaO are consumed by means of the reaction with $Ca_2SiO_4$(belite).

It was early recognized, as in German Pat. No. 337 312 of May 1921, that a quick heating resulting from intimate contact between flame and product had to be provided in order to achieve a good burning result not only during the sintering but in the heating-up phase between deacidification and alite formation. It was then proposed that a subdivided rotary kiln be used, having a sintering part rotating slower than the other part so that the kiln which serves to heat up material to the immediate proximity of the sintering point rotates with such a high speed that the product is lifted to the immediate proximity of the apex of the kiln and falls freely from there through the cross section of the kiln. Significantly higher heat transfer should occur in the convection zone theoretically as a result. This proposal, however, was never adopted because of the enormous amounts of dust which arose in the system gas.

The perception that it is very advantageous for reasons of energy saving and reaction kinetics to perform the heating between the calcination of the raw material and the maturing with the highest possible speed has led to other proposals. For example, a so-called fast burning of raw material is mentioned in DL Letters Pat. No. 97 409 where it is proposed to quickly heat a powdery or agglomerated mixture in an eddy type layer in a reactor, followed by sintering up to maturation. When extremely high heating gradients are employed in the temperature range between approximately 1100° and 1350° C., a reduction of the maturing time by approximately 70% can be achieved. For example, the reactor can be reduced in size or its throughput increased. The maturation may occur at lower temperatures with standard dwell times. The extremely high heating gradients also tend to avoid deactivation of the calcined product.

The attainment of fast burning, accordingly, produces a noticeable reduction of energy consumption which in turn leads to reduced capital and operating costs.

While there have been unresolved difficulties created by attempts to heat the raw material quickly, fast heating does have an effect on the properties of the matured cement clinker. For one, the clinker is not as highly sintered, i.e., it becomes more porous. A considerably higher amount of dust is produced in the exhaust gases of the rotary tubular kiln as a result. On the other hand, a porous clinker is desirable from the standpoint of being easier to grind into powder.

In a standard burning installation wherein there is countercurrent flow of burning product and gases, a porous clinker has a harmful effect as a result of the increased dust concentration since dust circulations are formed which result in considerable reduction of system performance and an increase in the specific energy consumption. In such instances, the proportion of additives which form melt phases have to be increased in order to reduce the dust circulation. Fluxes such as expensive iron ore have been used for this purpose. This has the disadvantage that the calcining temperature and consequently the specific fuel requirement is increased and the outlay for grinding energy is raised as a result of the production of a very hard clinker. Both factors have a negative effect regarding higher production costs and reduced output.

SUMMARY OF THE INVENTION

The present invention provides a method and an apparatus which does not result in increased dust production during burning so that the advantages of fast burning can be completely exploited and relatively small proportions of fluxes are used to produce a porous clinker which is easy to grind.

The method of the present invention involves heating the largely calcined product in the temperature range between approximately 900° C. and the beginning of alite formation which occurs at approximately 1250° C. as fast as possible. The material being treated in the clinker reaction passes in concurrent flow with the gas stream in the burner. Upon the completion of the burning reaction, the clinker is graded into coarse grained clinker and fine grained clinker upon discharge out of the burning stage and the coarse grained clinker and the fine grained clinker are cooled in separate coolers.

The method of the present invention permits the heating of the product with extremely high temperature gradients occurring in the range between completion of deacidification at approximately 900° C. and the beginning of alite formation at approximately 1250° C. since the creation of harmful dust circulations in the area of the rotary tubular kiln intake or of the calciner or of the preheater are completely avoided as a result of the concurrent flow between the gas and the product.

The rapid heating of the burning product to the temperature of alite stability maintains the high reactivity of the product achieved in rapid calcination so that the sub-theoretical heat consumption of the clinker formation declines resulting in a lower sintering temperature or in a shorter maturing.

The grindability of the relatively porous clinker is significantly improved and thus results in the saving of grinding energy. The cooler efficiency rises as a result of the grading into coarse and fine grained clinker and this feature also reduces cost. Finally, the dust charge of the cooling air is relatively slight, so that it can be used advantageously as combustion air.

In accordance with the present invention, the rapid heating of the largely calcined product in the temperature range of approximately 900° C. to 1250° C. is undertaken in concurrent flow in the flame zone of the burning stage, and is preferably undertaken with at least partial suspension of the powder in the gas stream of the burning stage. Utilizing the optimum, direct heat exchange between the suspended product and the flame or the flame gases results in the improved product without the disadvantage of excessive dust circulation.

In another feature of the present invention, rapid heating of the largely calcined product in the temperature range of 900° C. to the beginning of melt phase formation is initiated in a heating stage immediately preceding the burning aggregate in the direction of product throughput. When using such a preliminary heating stage, the most expensive portion of the system, the rotary tubular kiln, can be substantially shortened.

After the product is heated up to the beginning of alite formation, the clinker reaction into technical tricalciumsilicate proceeds under weak exothermic conditions so that a temperature increase of about 100° to 150° C. up to sufficient melt phase formation need only be handled by supplying additional heat and, moreover, a temperature equilibrium relative to irradiation and other thermal losses must be maintained during the maturing.

Heating the material in a separate heating stage preceding the burning stage has the further advantage that less fuel need be used because of the better heat transmission. In addition, the heating stage is smaller than the portion of the rotary tubular kiln previously employed for that purpose, and it can be better insulated since it is exposed to lower mechanical stresses.

Finally, the radiation losses of the rotary tubular kiln are also considerably reduced since the kiln need only be designed for maturing and it may have a shortened length together with optimum dwell times of the burning product, resulting in a higher filling ratio.

In contrast to standard burning methods currently employed, the gas streams in the present invention are directed differently. After separation of the fine grained clinker, the exhaust gas of the maturing stage is employed for heating the combustion air by means of indirect heat exchange. The cooled exhaust gas is supplied to a filter in a bypass to the heat treatment system and is cleaned of entrained dust therein. The cooled and dust-free exhaust gas is withdrawn from the heat treatment system and the heated combustion air is preferably supplied to the calcining stage. The buildup of harmful substances in the internal circulation of the system is avoided by means of newly proposed gas streams, as is the formation of dust circulation. The dust arising in the filter is entirely or partially discarded or is added to the fine grained clinker depending on its content of harmful substances. This measure is also advantageous for the suppression of circulations of volatile components. Such circulations, particularly those caused by substances such as K, Na, $SO_2/SO_3$ and Cl are particularly disadvantageous for heating in suspension since the buildup of these substances leads to the formation of melt phases far below the melt formation temperature in the salt-free system (approximately 1300° C.) and consequently may lead to tough encrustations on the reactor walls.

In conventional systems, a partial gas withdrawal from the kiln exhaust gases is necessary when using raw materials and fuels high in harmful substances in order to guarantee the operational reliability of the calciner and preheater. This is particularly true in a system with a separate heating stage since this heats the material nearly up to the temperature of melt phase formation.

When one or more specific components are to be removed from the product, it would be possible to withdraw only the exhaust gases from the heating stage alone or only the exhaust gases of the rotary tubular kiln alone, or to withdraw both on separate paths. This provides the uncomplicated possibility of achieving special compositions of bypass dusts and to supply these to separate re-employment depending on their composition.

The coarse grained clinker can be cooled in a grate cooler or tube radiator or shaft cooler. For the fine grained clinker, a cyclone cooler or fluidized bed cooler or shaft cooler can be employed. This provides considerable advantage insofar as the efficiency of the various cooler types is concerned, whereby the stages can be kept smaller and the exiting cooling air exhibits a higher re-employment value for the system because it contains more heat and less dust.

The method of the present invention also provides the possibility of controlling the quantitative proportions of coarse grained and fine grained clinker by means of proportioning of the addition of substances such as fluxing agents to the raw material which form melting phases. A small addition of fluxing agents effects a relatively porous clinker product resulting in saving energy and machine capacity and providing a clinker of better grindability. Since the grindability of the coarse grained clinker departs considerably from that of the fine grained clinker, one of the features of the present invention provides separate grinding means for the coarse grained and fine grained clinker.

In another embodiment of the invention, cooling air from the cooling stage as well as fuel are supplied to the heating stage and exhaust gas is introduced therefrom preferably into the burning stage. Cooling air from the cooling stage can also be at least partially introduced into the calcining stage and/or into the clinker stage. Depending on the content of harmful substances, the technique of introducing exhaust gas from the heating stage in the bypass to the burning stage into the exhaust gas free of fine grained clinker can also be employed.

The separate movement of gas streams from the calciner into the preheater and from there through an exhaust gas ventilator into the stack and, on the other hand, from the heating stage to the stack in the opposite direction over the kiln, the heat exchanger, and the filter and a separate exhaust gas ventilator is advantageous because the underpressure in the preheater and calciner can be kept at a normal value whereas the pressure relationships can be optimally designed for the air separation effect in the separating stage following the concurrent flow in the rotary tubular kiln.

The apparatus of the present invention includes a preheating stage, a calcining stage, a clinker burning stage and a cooling stage utilizing a rotary tubular kiln in the burning stage which has means at its burner side for feeding thermally pretreated material into concurrent flow with the gas stream in the kiln. It has a discharge arrangement with means for grading the clinker into a coarse grained fraction and a fine grained fraction, together with a separator for the fine grained fraction. Separate coolers are provided for the coarse grained and fine grained fractions.

Specifically, the discharge arrangement may include a conical taper in the discharge area of the rotary tubular kiln which has conveying means for discharging coarse grained clinker therefrom. The taper discharges into a discharge shaft which is connected to the coarse grained cooler and also includes a preferably horizontal exhaust gas channel having a separator whose solids discharge is connected to the fine grained cooler and whose gas discharge is connected to an exhaust gas system.

When a grate cooler is employed as the coarse product cooler, exhaust air arising in the last cooling zone can be advantageously mixed into the kiln exhaust gas stream as cooling air. Dust removal is thereby completed and the operational reliability of the separating stage is also improved for separating fine clinker from the kiln exhaust gas. The exhaust gas of the fine product cooler then has a lower temperature level and can be employed in an advantageous manner as "mean air" for the coarse product cooler.

BRIEF DESCRIPTION OF THE DRAWINGS

A further description of the present invention will be made in conjunction with the attached sheets of drawings in which.

DESCRIPTION OF THE PREFERRED EMBODIMENTS

Figure 1:
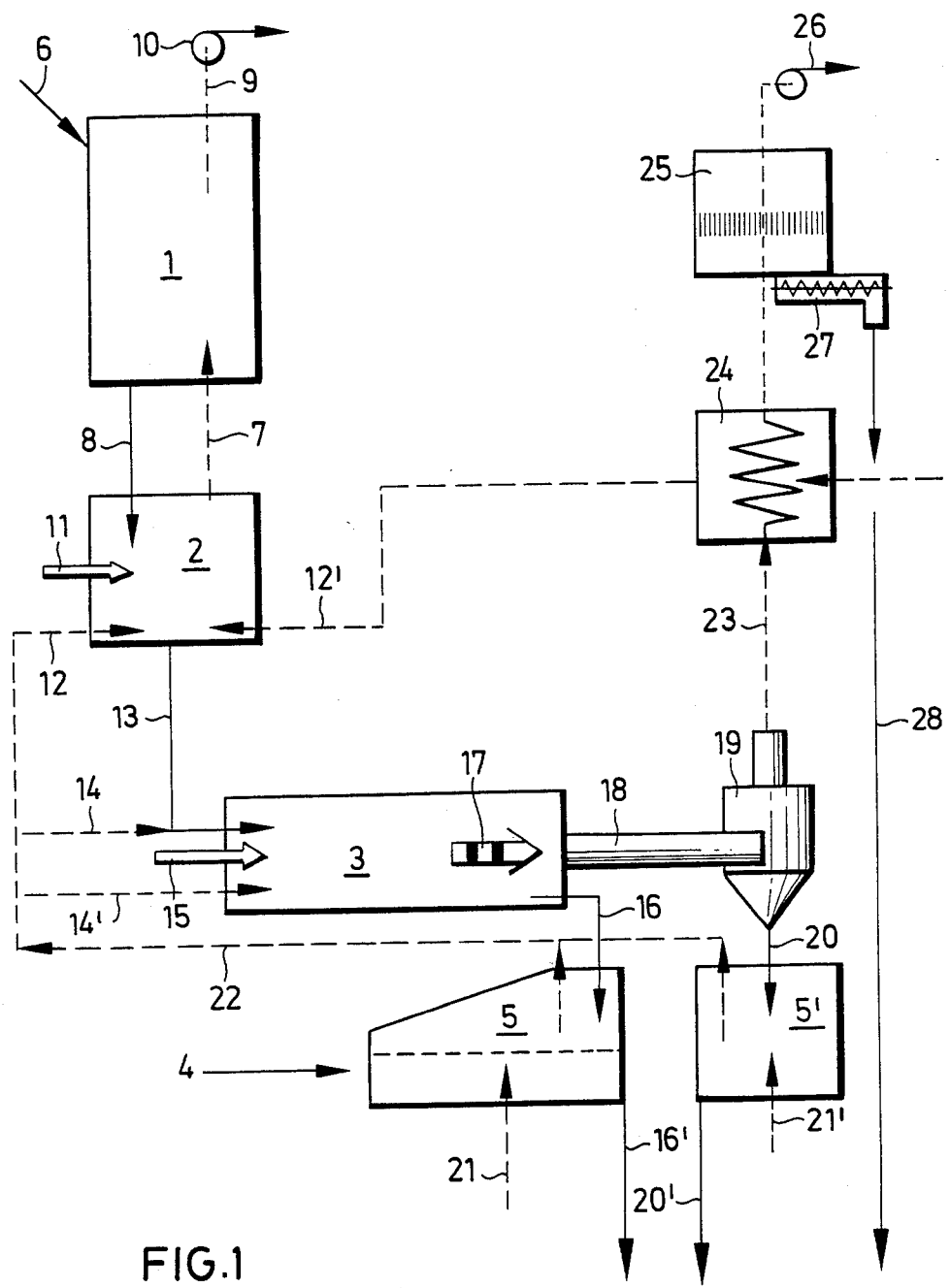
FIG. 1 is a block diagram of one form of burning installation according to the present invention.

The heat treating system of the present invention according to FIG. 1 comprises a preheating stage 1, a calcining stage 2 following the preheating stage 1, a clinker burning stage 3, and a cooling stage 4 having two coolers 5 and 5'. The preheating stage 1 is designed as a suspension type heat exchanger and functions with countercurrent flow of gas and product. A fine grained burning product is introduced into the upper range of the preheating aggregate 1 as indicated by the arrow 6 and, in a plurality of heat exchanger cyclones (not illustrated) disposed in series, a heat exchange occurs with hot gases supplied from the calcining stage 2 as indicated by the arrow 7. After their reduction in temperature, the hot gases leave the preheating stage 1 over an exhaust gas line 9 provided with an exhaust gas ventilator 10.

Figure 5:
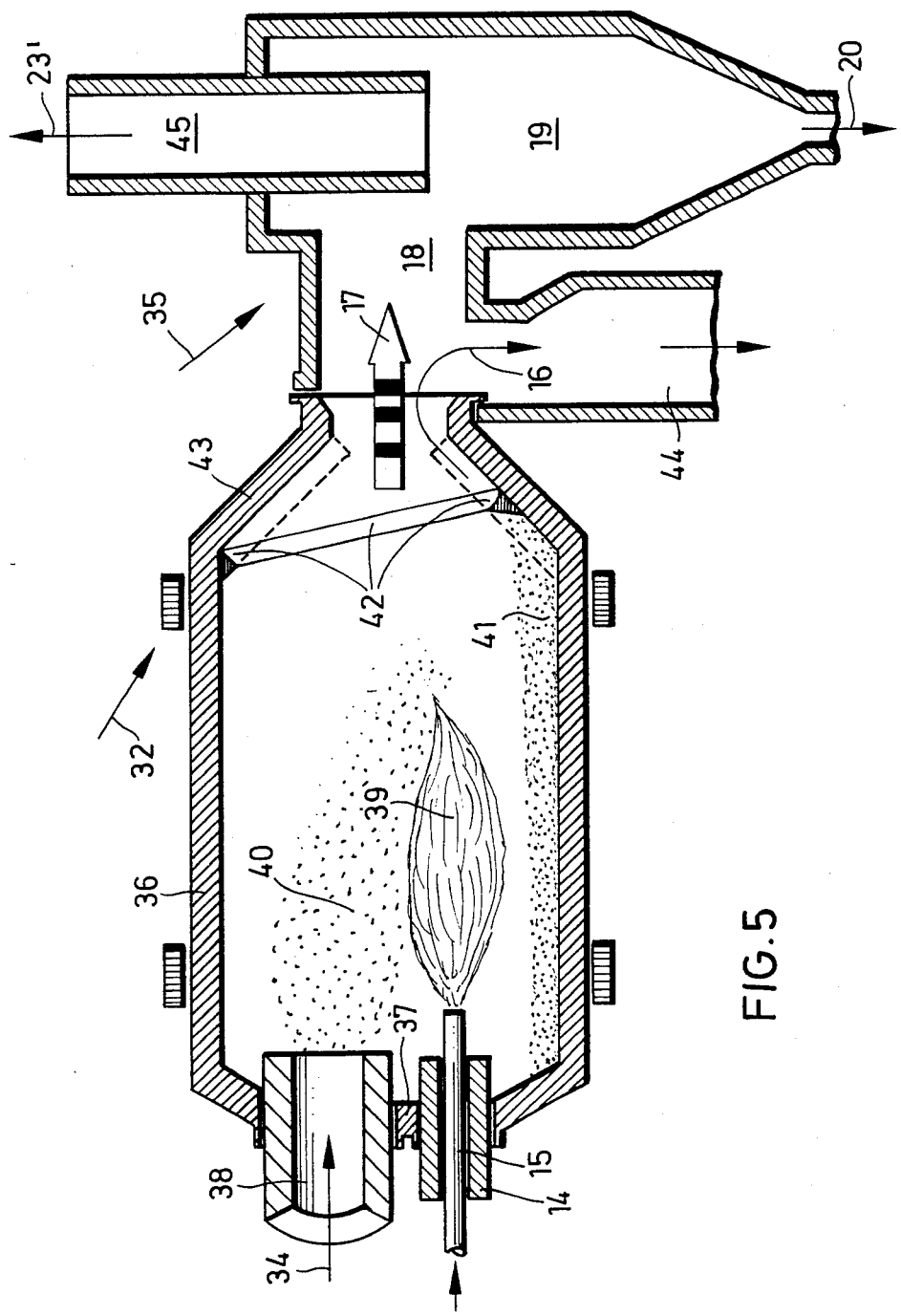
FIG. 5 is a fragmentary cross-sectional view of a rotary tubular kiln which can be used in accordance with the present invention, showing particularly the discharge arrangement for coarse and fine clinker.

The preheated product in line 8 is calcined in the calcining stage 2 with the introduction of fuel through a line 11 and hot combustion air through a line 12 or through a line 12'. It leaves the calcining stage 2 with a temperature level of approximately 900° C. as a calcined product through a line 13. This product together with a hot carrier gas is introduced as a particle suspension into the clinker burning stage 3 and is heated therein in concurrent flow with the flame 39 (FIG. 5) of a burner 15 with an extremely rapid temperature gradient in a powder cloud 40 (FIG. 5). After sedimentation to the product bed, the material is finish-burned into clinker. Hot tertiary air from the coolers 5 and 5' is supplied to the clinker burning stage 3 by means of a line 14'. The clinker burning stage 3 is a relatively short rotary tubular kiln in which the clinker burning is conducted by concurrent flow of product and gas. A relatively porous coarse grained clinker is produced which is discharged to a discharge line 16 and is introduced into the coarse grained cooler 5. Fine grained clinker mixed with hot combustion gas is discharged from the burning stage 3 as indicated by the arrow 17 and is conducted through a discharge channel 18 into a separator 19. In the separator 19, the fine grained clinker is separated from the gas and the clinker is directed to the fine grained cooler 5' through a line 20. In this manner, coarse grained clinker and fine grained clinker proceed separately into matched coolers 5 and 5' and are cooled therein by means of supplying cooling air through lines 21, 21' under optimum conditions for each cooler. Hot air withdrawn from the two coolers 5, 5' may be introduced into the heat treatment system through a line 22. Exhaust gas separated from the fine grained clinker is conducted by means of a line 23 into an indirect heat exchanger 24 operating as a recuperator. The heat content of the exhaust gas stream is employed for heating combustion air which passes to the calcining stage 2 by means of a conduit 12'. The exhaust cooled in this manner is finally conducted through a bypass filter 25 and is cleaned of entrained dust. The dust-free and cooled exhaust gas is finally eliminated from the system by means of an exhaust gas ventilator 26. Depending on the content of harmful substances, the dust produced in the filter 25 is either discarded or added to the cooled, fine grained clinker by means of a conveyor 27 and a conduit 28.

Figure 2:
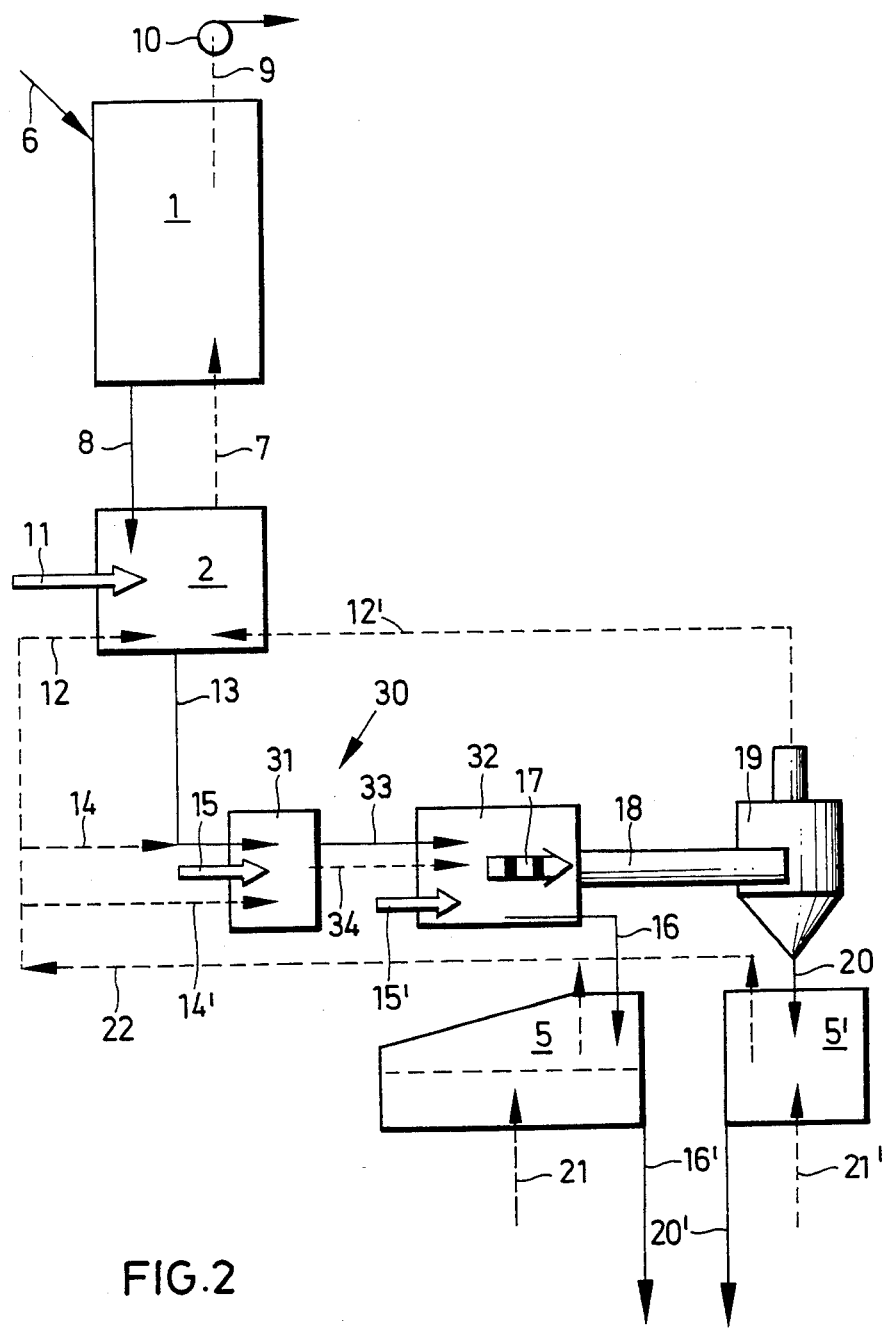
FIG. 2 is a block diagram of a modified burning apparatus according to the invention wherein the clinker stage is formed by an extremely short rotary tubular kiln preceded by a heating stage.

The system of FIG. 2 differs from FIG. 1 by subdividing the clinker stage 30 into a heating zone 31 and a burning zone 32. A largely calcined product is introduced into the heating zone 31 by means of a line 13 and is propelled therethrough by means of a hot carrier gas introduced through a line 14. Fuel is supplied to the heating zone with a burner 15 and hot combustion air is supplied with a line 14'. Heating at extremely high temperature gradients is accomplished in the heating zone 31 from the temperature of the calcined product which is approximately 900° C. up to beginning alite formation at approximately 1250° C. The product heated in this manner is introduced into the burning zone 32 by means of a line 33, and is mixed with hot gas entering through a line 34. Fuel is added to a burner 15'. The burning zone 32 consists of an extremely short rotary tubular kiln which, essentially as a maturing kiln, heats the product up to the temperature of melt phase formation, namely from 1250° C. up to approximately 1350° or 1450° C., and completes the finish-burning in the product bed. Otherwise, the discharges of product are the same as shown in FIG. 1, that is, coarse grained clinker is delivered into a coarse grained cooler 5 by means of a line 16 and fine grained clinker is deposited in a fine grained cooler 5' through a line 20. The exhaust gas separated from the fine grained clinker with a separator 19 proceeds into the calcining stage 2 by means of the conduit 12' in the event that no significant harmful substances are contained in the exhaust gas. In the system shown in FIG. 2, moreover, the exhaust gas stream of all stages are conducted out of the system on a path over the calcining stage 2 and the preheating stage 1 as well as the exhaust gas conduit 9 and the exhaust ventilator 10. The pressure differential required for this purpose is relatively high. A pressure boosting, hot gas ventilator (not shown) may be provided in the line 12' to meet this pressure differential.

Figure 3:
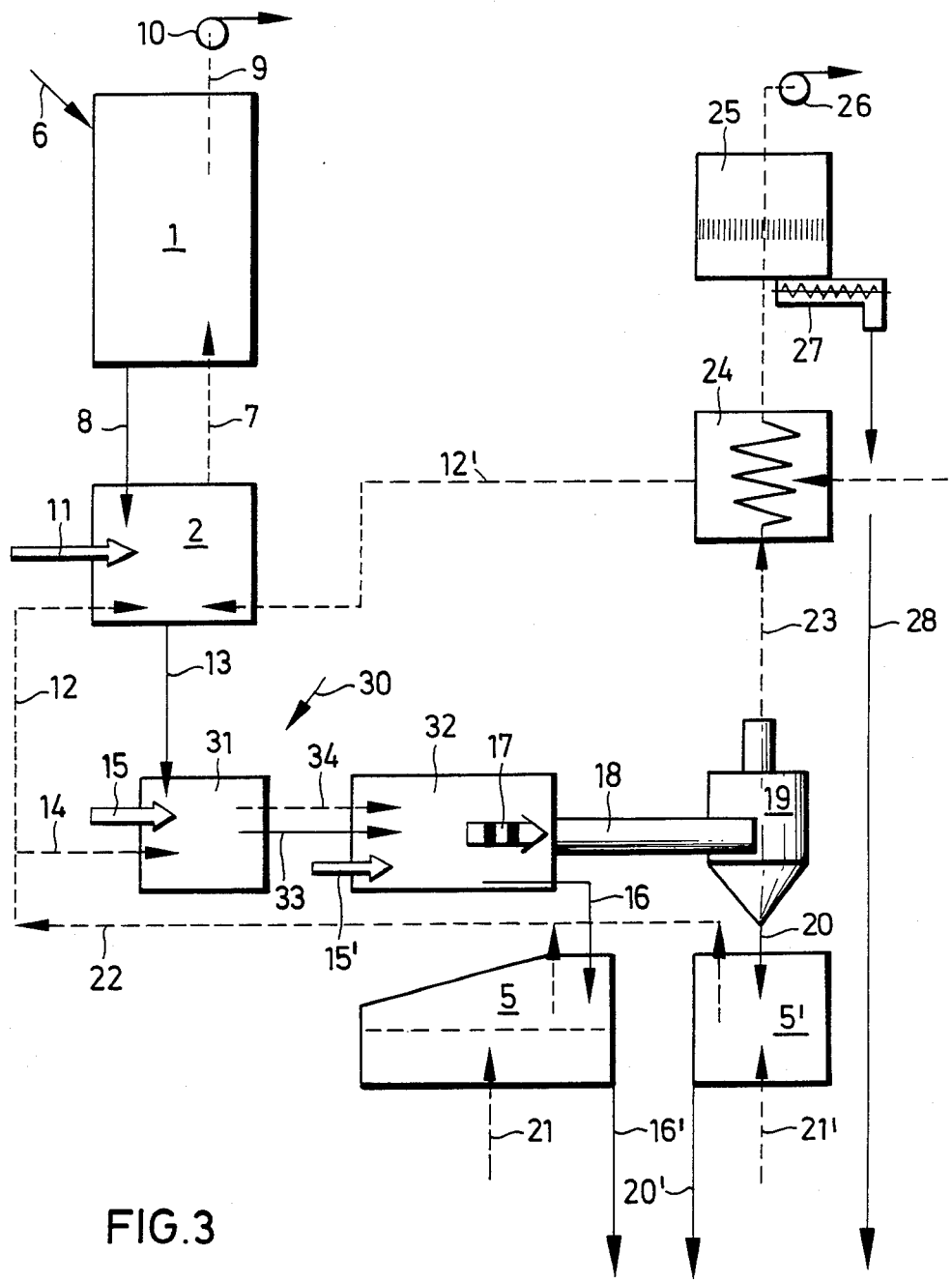
FIG. 3 is a block diagram of a still further modified form of the invention which involves bypass of exhaust gas from the burning stage.

Any problem resulting from the magnitude of the underpressure is resolved in the system shown in FIG. 3. As in the case of the system of FIG. 1, the exhaust gas of the clinker stage 30 is conducted through a conduit 23, and a heat exchanger 24, the latter having a bypass filter 25 and an exhaust gas ventilator 26 associated therewith. Dust arising in the filter 25 is discharged by means of a conveyor 27 in the same manner as in FIG. 1 and is withdrawn through a conduit 28 to be either discarded or added to the fine grained clinker exiting the fine grained clinker 5'. Hot air recuperated in the heat exchanger 24 is introduced into the calcining stage 2 by means of the conduit 12' and hot cooling air withdrawn from the coolers 5 and 5' is supplied to the heating stage 31 and/or the calcining stage 2 through a line 22 as combustion air.

Figure 4:
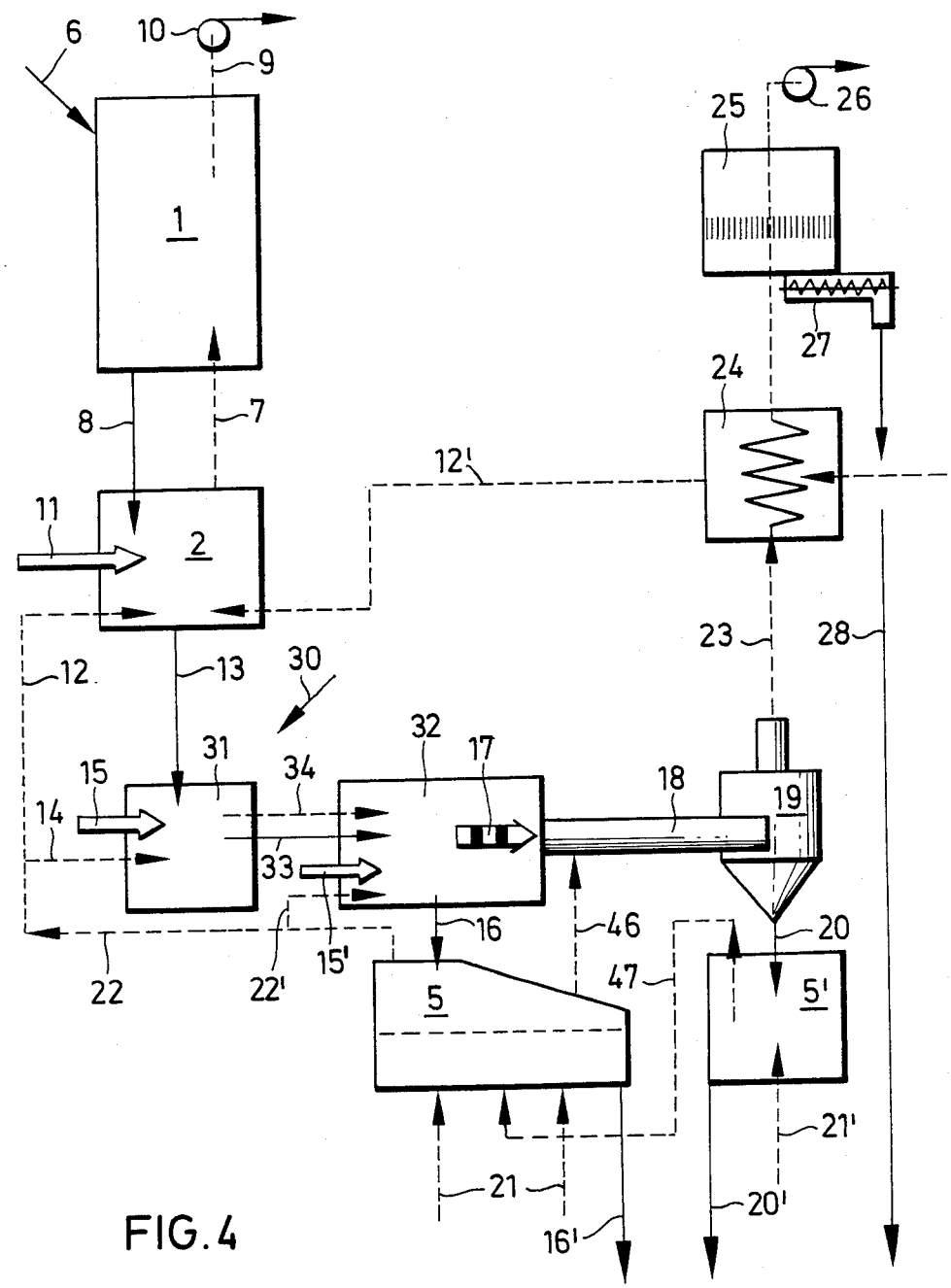
FIG. 4 is a block diagram of a modified installation which involves admixing grate cooler exhaust air into the kiln exhaust gas and reintroduction of the heated fine grained cooler air into the center of the grate cooler.

In the event a grate cooler is employed as the coarse grained cooler 5, FIG. 4 shows the delivery of exhaust air from the last part of the grate cooler as seen from the product side into an exhaust gas line 18 of the burning stage 32 over a conduit 46. In addition to fresh air entering through lines 21, exhaust air from the fine grained cooler 5' is supplied to the grate cooler 5 over a conduit 47. In addition, FIG. 4 shows the possibility of directly supplying combustion air required for the burner 15' by means of a conduit 22'.

FIG. 5 illustrates the construction of a typical burning stage 32 having a discharge means 35. The burning stage 32 comprises a very short rotary tubular kiln 36. There is provided a non-rotating wall part 37 at the left-hand side in which a burner 15 is disposed below a product introduction channel 38. Hot secondary air is supplied thereto by means of the line 14 which annularly surrounds the burner 15. A completely calcined and largely heated product supplied as indicated by the arrow 34 from the heating stage 31 at approximately 1200° C. through 1250° C. first forms a powder cloud 40 above the flame 39. It thereby absorbs quantities of heat required for the maintenance of the clinker reaction in the melt phase, absorbing the heat in the radiation and convection zone of the burning stage 32. The material is thereby burned into clinker while being heated to approximately 1350° C. to 1450° C. As is well known, the lime component essentially combines with the silicon component upon the addition of slight amounts of fluxing agents such as iron and aluminum compounds, whereby the portland cement clinker is produced in the course of the phase mixture. The particles agglomerating as a result of the melt phase formation precipitate out of suspension in the burning process and form a product bed 41 on the floor of the rotary tubular kiln 36. A coarse grained clinker is discharged from a conically tapering area 43 of the rotary tubular kiln 36 by means of a conveying device such as a helical chute 42 and as indicated by the arrow 16 is discharged through a discharge shaft 44 into the coarse grained cooler 5. The fine grained clinker on the other hand is entrained in the accelerated gas stream 17 which is discharged through a discharge channel 18 into the separator 19 and is separated from the exhaust gas therein. As shown by arrow 20, the fine grained clinker is discharged from the separator 19 and is delivered to the fine grained cooler 5'. Exhaust gas leaves the separator cyclone 19 through a dip pipe 45 for passage through the exhaust gas line 23 as shown by the arrow 23'.

It should be evident that various modifications can be made to the described embodiments without departing from the scope of the present invention.

We claim as our invention:

1. In a method for burning a fine grained product such as raw cement meal which comprises:
   preheating said meal in a preheating stage,
   calcining the preheated meal in a calcining stage,
   burning the calcined meal into clinker in a burning stage, and
   cooling the clinker in a cooling stage, the improvement which comprises:
   rapidly heating said calcined meal to a temperature between 900° C. and 1250° C. by passing said meal in suspension in a gas in concurrent relation with hot gases in said burning stage,
   grading the clinker into a coarse grained fraction and a fine grained fraction upon leaving said burning stage, and
   separately cooling said coarse grained and fine grained fractions.

2. The method of claim 1 in which:
   said rapid heating takes place in the flame zone of said burning stage.

3. The method of claim 1 in which:
   said rapid heating begins in a heating zone immediately preceding said burning zone.

4. A method according to claim 1 which includes the steps of:
   subjecting the exhaust gas from said burning stage to heat exchange with combustion air to heat the same,
   filtering the cooled exhaust gas to remove dust therefrom, and
   passing the heated combustion air to the calcining stage.

5. A method according to claim 4 which includes the steps of:
   combining the dust from the filtering with said fine grained fraction.

6. A method according to claim 1 wherein:
   said coarse grained clinker is cooled in a grate cooler, tube radiator, or shaft cooler and
   said fine grained clinker is cooled in a cyclone cooler, fluidized bed cooler, or shaft cooler.

7. A method according to claim 1 in which:

the relative amounts of coarse grained and fine grained clinker are controlled by the addition of a fluxing agent to the raw meal.

8. A method according to claim 1 which includes the step of:
separately grinding the coarse grained and fine grained clinker fractions.

9. A method according to claim 3 which includes the step of:
supplying cooling air and fuel into said heating zone, and
passing exhaust gases from said heating zone into said burning zone.

10. A method according to claim 1 which includes the step of:
introducing cooling air from said cooling stage into said calcining stage.

11. A method according to claim 1 which includes the step of:
introducing cooling air from said cooling stage into said burning stage.

12. A method according to claim 1 in which at least a portion of the exhaust air resulting from cooling said coarse grained fraction is added to the exhaust gas from said burning stage to cool the same.

13. A method according to claim 1 which includes the step of:
supplying exhaust air from the fine grained fraction cooling to the coarse grained fraction cooling.

14. An apparatus for burning a fine grained product such as raw cement meal comprising:
a preheating stage,
a calcining stage receiving preheated meal from said preheating stage,
a rotary tubular kiln having a burner therein providing a flame and hot exhaust gases,
means for introducing meal from said calcining stage into said kiln in concurrent flow relation with said hot exhaust gases,
means for separating the thus treated meal into a coarse grained fraction and a fine grained fraction, and
separate cooling means for said coarse grained fraction and said fine grained fraction.

15. An apparatus according to claim 14 which includes:
an additional heating stage between said calcining stage and said rotary kiln.

16. An apparatus according to claim 14 wherein:
said rotary kiln includes a conical taper at its discharge end,
conveying means located in said conical taper and arranged to discharge a coarse grained fraction into the cooling means for said coarse grained fraction,
a separator connected to the discharge end of said kiln to receive said fine grained fraction, and
means for discharging solids from said separator into the cooling means for said fine grained fraction.

17. An apparatus according to claim 16 which includes:
a heat exchanger receiving hot gas from said separator,
means for circulating air into heat exchange relationship with said hot gas,
means for delivering the thus heated air for combustion in said calcining stage, and
a dust removing filter connected to the heat exchanger for filtering the gas after passing through said heat exchanger.

18. An apparatus according to claim 14 which includes:
conduit means directing air from the coarse grained cooler into said kiln.

19. An apparatus according to claim 14 which includes:
conduit means directing air from the coarse grained cooler into said calcining stage.

20. An apparatus according to claim 14 which includes:
separate grinding means for each of the separate cooling means.

* * * * *